UNITED STATES PATENT OFFICE.

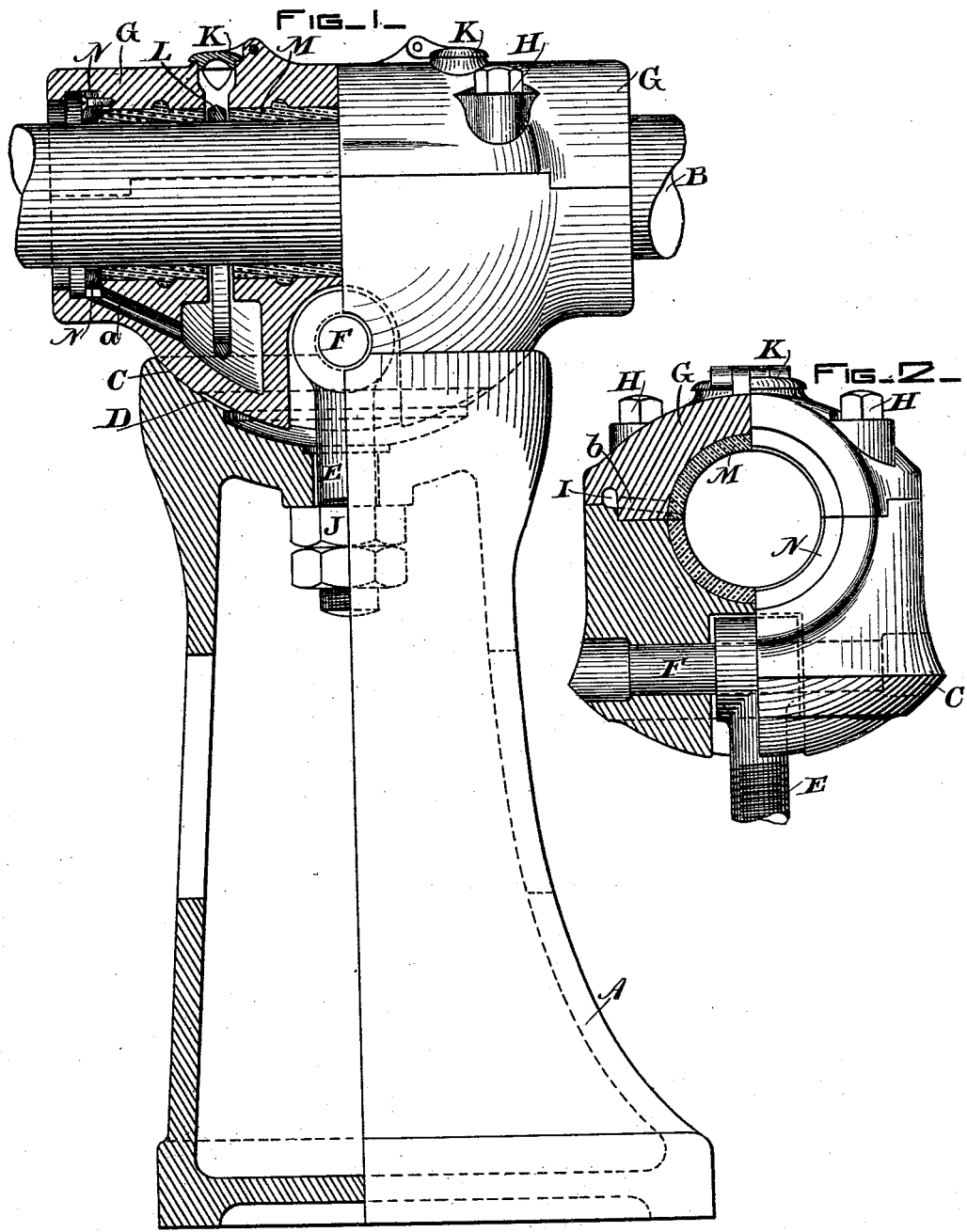

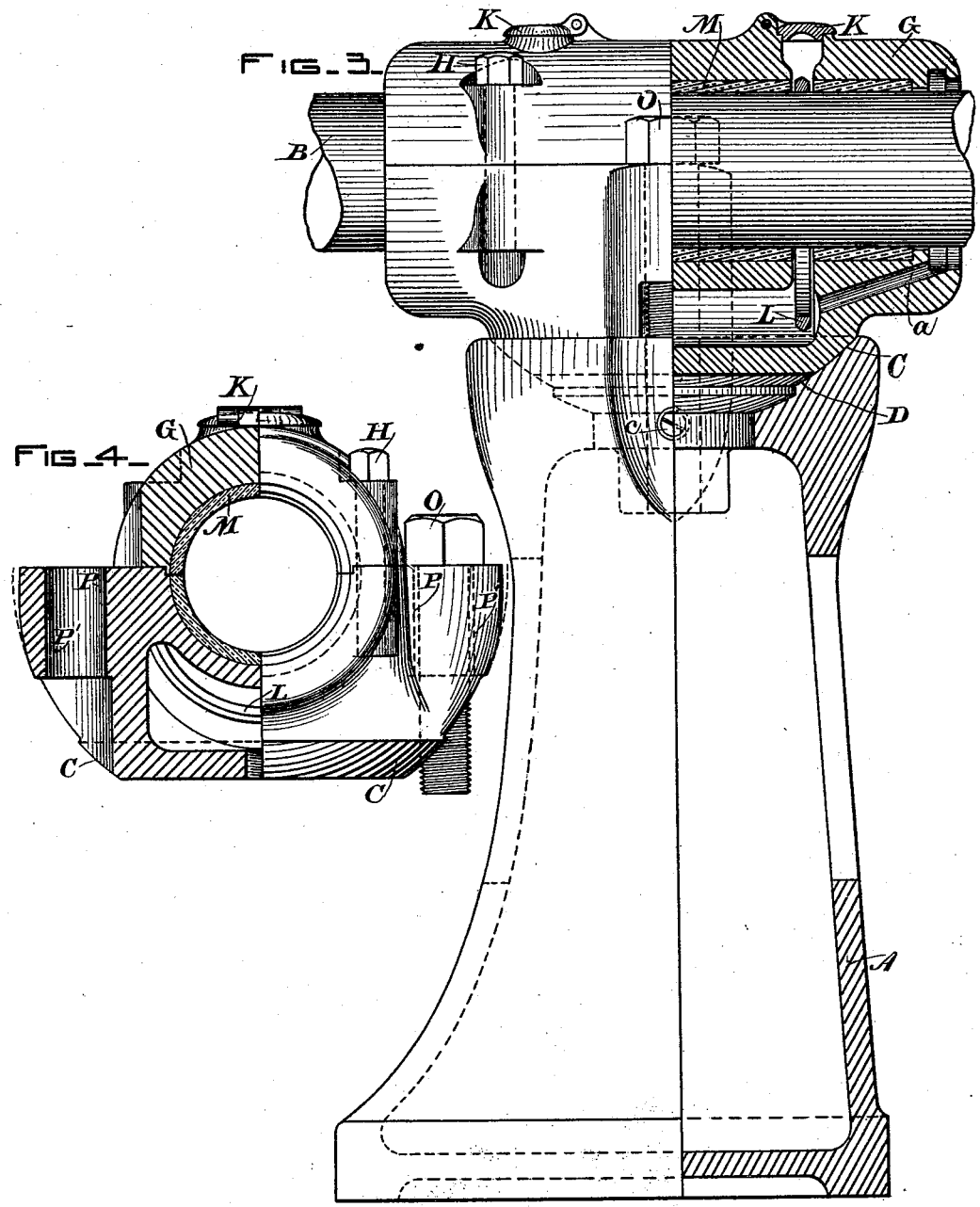

WILLIAM O. WAKEFIELD, OF LYNN, MASSACHUSETTS, ASSIGNOR TO THE THOMSON-HOUSTON ELECTRIC COMPANY, OF CONNECTICUT.

JOURNAL-BOX.

SPECIFICATION forming part of Letters Patent No. 469,730, dated March 1, 1892.

Application filed November 12, 1890. Serial No. 371,258. (No model.)

*To all whom it may concern:*

Be it known that I, WILLIAM O. WAKEFIELD, a citizen of the United States, residing at Lynn, county of Essex, and State of Massachusetts, have invented a certain new and useful Improvement in Journal-Boxes of which the following is a specification.

In designing the improved journal-box, which constitutes the subject of my present invention I have had more particularly in mind the making of one well adapted for use with dynamo-electric machines in which the armature-shaft runs at a high rate of speed and gives rise to much trouble from heating if any considerable friction is felt at the bearings. I do not, however, intend to limit myself to this particular application, for the box herein described will be found of advantage wherever it is desired to journal a shaft or line of shafting.

My improvements, in general terms, consist in forming a spherical bearing upon the lower side of the box in which is seated in a correspondingly-shaped stand or support, to which the box is secured by a bolt or bolts, allowing free adjustment of the box in vertical and horizontal planes to accommodate itself to the shaft, the bolting devices engaging with the bearing on each side of the center thereof, so as to give greater stability. A cap or cover is secured to the lower part of the box by separate bolts or screws, and the whole, as will be seen, constitutes a compact enduring construction, allowing ready access to the bearing, and reducing friction to a minimum by reason of the ease with which the box may assume an exact parallelism with the shaft.

These improvements, and also other specific details not outlined above, are illustrated in the accompanying drawings, wherein—

Figure 1 shows a journal-box of my approved pattern and stand, half in section and half in side view. Fig. 2 is a similar half-section and half end view of the box with shaft removed; and Figs. 3 and 4, views corresponding to Figs. 1 and 2, but showing a slightly-modified construction.

In the views, A represents a stand or pedestal serving as a support for the box and a shaft B, which is journaled therein. Upon the lower part of the box there is provided a spherical bearing-surface C, fitting a corresponding spherical seat D upon the pedestal. A vertical bolt E secures the lower part of the box to the stand and allows rotation in a horizontal plane, while a pin F, passing through the box and an eye in the bolt E, affords a second center of movement for the box, permitting its adjustment in a vertical plane. The spherical surface D is made, as shown, somewhat wider than that upon the box in order to allow for the greatest possible variation in vertical position which the box is likely to have.

A cap or cover G, forming the upper portion of the box, is secured to the lower part of the box by a separate set of bolts H, and around the meeting surfaces, where the cap rests on the lower part of the box, there is formed a channel I, parallel with the shaft, for a purpose hereinafter described.

The shaft is put in position in the box in the ordinary manner and the cap secured in place. Then to attach the box to the stand it is only necessary to pass the pin F through the box and an eye in bolt E and to screw up the nuts J seen on the inside of the pedestal.

The lubricant is introduced into the box through openings covered by caps K, and it is taken up from the oil-receptacle $l$ by metal rings L, whence it passes along the journal through scores or grooves in the babbitt M and is returned to the receptacle by ducts $a$, leading from the ends of the box. These parts are all well known and no claim of invention is made thereto. It is found that oil is likely to work out by capillary action between the cover and box, and the channel I serves a twofold purpose. It cuts off the capillary action, tending to conduct the oil outward, and serves also as a reservoir for collecting this escaping oil, from which it is returned to the interior of the box through openings $b$, of which there may be one or more, as desired. The usual collars are seen at N, and are made in sections to facilitate their removal when needed.

In Figs. 3 and 4 the general arrangement of parts is the same as in the views already described. Slightly-different means, however, are used for securing the box to the pedestal. Instead of the center vertical bolt and pin there are two side bolts O, passing through arms in the lower part of the box, and the openings provided for them are enough larger than the bolts to permit the desired amount of vertical and horizontal play. This is seen in Figs. 3 and 4, where the dotted lines P P' represent the sides of the openings through which the bolts pass, and, as will also be observed, the seats for the heads of the bolts are slightly rounded to allow adjustment without binding. Set-screws c may be used to secure the bolts against displacement.

It will be seen that in both of the above modifications the bolting devices have a positive clamping engagement with the box on each side of the center thereof, thereby giving a firm and stable attachment. This purpose is further subserved by the attachment of the bolting devices at a point eccentric to the spherical supporting-surface, as shown, as there is then less tendency to turn on such surface when the parts are clamped in place.

Should it be desired to rebabbitt the box, it can be swung freely around the shaft after taking out the bolts, because the spherical bearing-surface is turned from a center coincident with the center of the shaft, and, as shown in Figs. 2 and 4, the box is so shaped that the parts adjacent to the bearings are at a less distance or at no greater distance from this center than is the periphery of the spherical seat, so that when the box is turned to one side or the other there is no interference with its movement. In other words, there are no projecting parts immediately adjacent to the bearing-surface.

From the construction described above it is evident that the box can automatically adjust itself with ease into alignment with the shaft. It can be readily secured to the pedestal and the cap can be removed, when access to the bearing is desired, without interfering in any way with the other parts of the box or their attachment to the pedestal.

I claim—

1. The combination, with the shaft and the journal-box having a spherical supporting surface concentric with the shaft, of the stand or support having a spherical seat corresponding to the surface on the journal-box, and clamping devices engaging with the stand and with the journal-box on each side of the center of the box.

2. The combination, with the shaft and the journal-box therefor having a spherical supporting-surface concentric with the shaft, of the stand or support having a spherical seat corresponding to said surface, and a bolt engaging with said stand and pivoted to said journal-box by a pivot transverse to the shaft, as described.

3. The combination of the shaft, the journal-box therefor having a spherical supporting-surface, a support having a spherical seat for said surface, a pivot-pin on the journal-box, and a bolt engaging with said pin and with the support and free to turn, thereby permitting the box free movement in vertical and horizontal planes, as set forth.

4. The combination of the shaft, the journal-box therefor having a spherical supporting-surface, a support having a spherical seat for said surface, a pivot-pin on the journal-box transverse to the line of the shaft, and a bolt engaging with said pin and with the support and free to turn, thereby permitting the box free movement in vertical and horizontal planes, as set forth.

In testimony whereof I have hereto set my hand this 8th day of November, 1890.

WILLIAM O. WAKEFIELD.

Witnesses:
 JOHN W. GIBBONEY,
 ELIHU THOMSON.